May 30, 1967 J. J. MELE 3,322,001
POTTED BUSHING
Filed Feb. 14, 1964

INVENTOR.
JOSEPH J. MELE
BY Charles Marks
ATTORNEY

United States Patent Office 3,322,001
Patented May 30, 1967

3,322,001
POTTED BUSHING
Joseph J. Mele, North Bellmore, N.Y.
(188 Warner Road, Huntington, N.Y. 11743)
Filed Feb. 14, 1964, Ser. No. 345,026
5 Claims. (Cl. 77—62)

This invention relates generally to drill bushings and is particularly concerned with drill bushings which are embedded in plastic mountings provided in tooling plates and the like. Drill bushings thus embedded in plastic are known as potted bushings.

In practice, such bushings are subjected to conditions which tend to dislodge them from their positions within the tooling plates in which the bushings are disposed. Thus, it is customary for a tooling plate to surmount a member intended to be drilled and to employ the bushings to guide a suitable drill into operative engagement with such member. However, it frequently happens that when the drilling operation ends, the drill is accelerated in the direction of drilling as it emerges from the drilled member. This acceleration often exposes the bushings to the impact of the drill chuck, thereby tending to dislodge them from the tooling plate or to injure their plastic mountings.

Again, repeated drilling may give rise to heating of the bushings so as to soften the surrounding plastic. When this occurs, dislodgement by the above-described mechanism is facilitated. In addition, such softening permits misalignment of the bushings and their rotation by the drill in a manner which would increase the likelihood of dislodgement from the tooling plate.

It has also been found that the surfaces of conventional bushings often include films of oil and particles of dirt which interfere with the proper bonding of the bushings to their intended plastic mounting. Here again, such interference facilitates the possibility of their dislodgement from such mounting.

The present invention is aimed at a solution of these problems.

Thus, it is an object of the present invention to provide an improved drill bushing which has superior resistance to dislodgement from the tooling plate with which it is used.

Another object of the invention is to provide a drill bushing of the character described, which is highly resistant to axially directed impact thereon and to any tendency to rotation.

A further object of the invention is to provide a drill bushing of the character described which has a reduced capacity for transmitting heat to any adjacent structures.

A still further object of the invention is to provide an improved metallic drill bushing of simple and sturdy design, which can be easily manufactured by conventional means.

Other objects and advantages of the invention will become apparent from the following discussion as read in connection with the accompanying drawing.

In the drawing.

Throughout the various views, similar numerals are employed to depict similar parts of the said embodiment of the invention.

Figure 1:
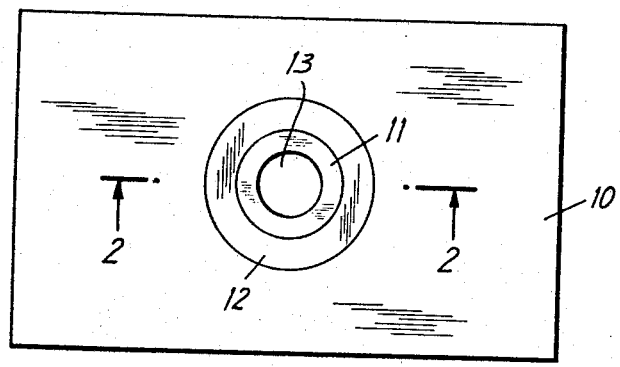
FIG. 1 is a plan view illustrating a tooling plate wherein one embodiment of the invention is employed.

As may be seen in FIG. 1 of the accompanying drawing, one embodiment of the invention may be employed in a tooling plate 10 of conventional design. In such a tooling plate, the embodiment of the invention comprises a bushing 11 embedded in a plastic mounting 12 which can be moulded by conventional means about such bushing 11.

Figure 2:
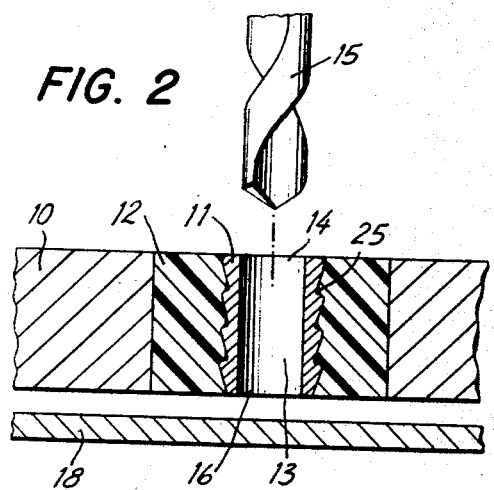
FIG. 2 is an enlarged cross-sectional view taken about the line 2—2 of FIG. 2 and illustrating the bushing in operative relation to a member intended to be drilled.

The bushing 11 is provided with a drill passage 13 and, as may be seen in FIG. 2, such drill passage 13 includes an upper mouth 14 adapted to receive a suitable drill 15 and a lower exit 16 from which such drill may project so as to engage a workpiece or other member 18 intended for drilling.

The external surface of such bushing includes important features of the present invention. Thus, as may be seen in FIG. 3 of the accompanying drawing, a plurality of annular shoulders 19 are provided upon such external surface. In addition, a plurality of annular tapered portions 20 are also provided upon such surface.

The annular shoulders 19 are disposed radially of the axis of the bushing. The radially outward portions of these annular shoulders are tangential to convex surfaces 21; and the radially inward portions of the annular shoulders are tangential to concave surfaces 22.

Figure 3:
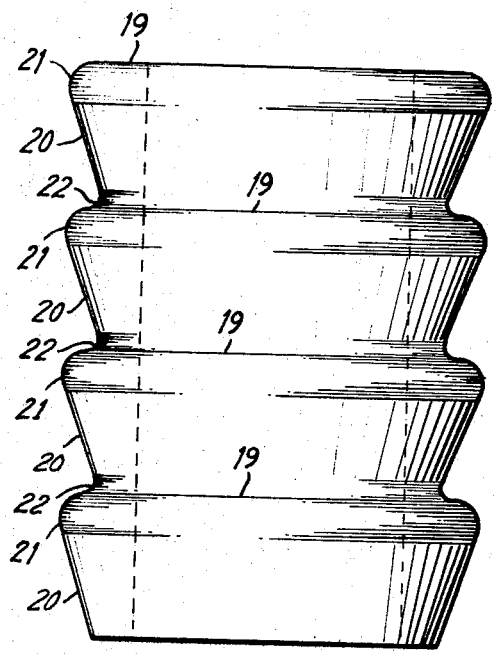
FIG. 3 is an elevational view of the bushing depicted in FIGS. 1 and 2.

As shown in FIG. 3, it will be seen that the annular shoulders 19 are the upper and lower portions respectively of the said convex and concave surfaces 21, 22.

Figure 4:
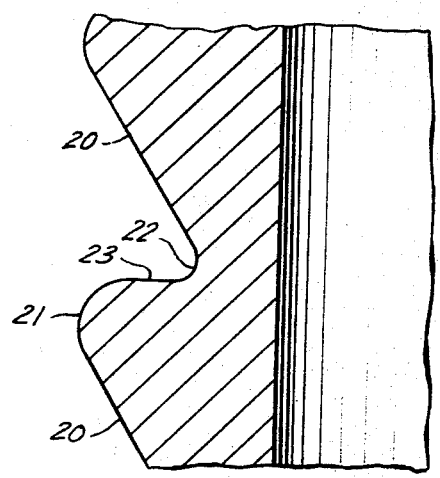
FIG. 4 is a fragmentary elevational view of a portion of a modified form of said bushing.

A modified form of the aforesaid conformation is depicted in FIG. 4 which depicts in cross-section, a portion of the wall of the bushing wherein the annular shoulder comprises a flat element 23 which is tangential to the convex surface 21 at the radially outward portion of the external surface of the bushing and to the concave surface 22 at the radially inward portion of the bushing.

It will be seen that in the event of a downwardly directed impact upon the above described forms of the invention, the tapered portions 20 thereof will exert a compressive pressure upon the plastic mounting 12 and that the annular shoulders of the bushing, by virtue of adhesion, will exert a tensile pressure upon such plastic mounting. Since the tapered portions and annular shoulders are annularly continuous, the said compressive and tensile pressures will be uniformly distributed upon the adjacent mating surface of the plastic mounting. Moreover, it will be seen that stress concentrations upon such mating surface of the plastic mounting are also eliminated by virtue of the convex and concave surfaces which are disposed in the manner hereinabove noted.

It will also be seen that adhesive forces exist between the external surface of the bushing and the mating surface of the plastic mounting; but that in the event that such adhesive forces should be overcome during drilling, the bushing will tend to rotate within the plastic mounting but that such rotation will not accomplish an axial displacement of the bushing from the plastic mounting. Thus, since the external surface of the bushing is characterized by continuous annular curves, as described above, there will be no tendency for such rotation to produce a cutting action upon the plastic mounting so as to destroy its capacity for opposing axial dislodgement of the bushing—as is frequently the situation with conventional bushings.

Again, it will be noted from an inspection of FIG. 2 of the accompanying drawing that voids 25 or air pockets will tend to form during the embedding of the bushing within the plastic mounting 12, thereby disposing portions of the concave surfaces 22 in spaced relation with respect to such plastic element 12. These voids or air pockets act as insulators which minimize the transfer of heat from the bushing to the plastic mounting during the drilling operation. Thus, these voids or air pockets minimize the tendency of the plastic mounting to soften by virtue of heat generated by friction between the bushing and the drill during such drilling operation; and hence, the likelihood of misalignment of the bushing, which might be permitted by such softening of the plastic element, is correspondingly reduced.

It will also be seen that the above-described forms of the invention can be easily, quickly and economically manufactured by standard equipment such as conventional machine tools.

The embodiments of the invention illustrated and described hereinabove have been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:
1. A drill bushing comprising:
   (a) a body provided with a drill passage therethrough;
   (b) the external surface of the body including at least one radially disposed annular shoulder and a generally tapered portion terminating at said radially disposed annular shoulder;
   (c) said drill bushing being embedded in a plastic element;
   (d) the terminus of said generally tapered portion at said radially disposed annular shoulder being in radial spaced relation with respect to said plastic element so as to define a void which acts as an insulator.
2. A drill bushing comprising:
   (a) a body provided with a drill passage therethrough;
   (b) the external surface of the body including at least one radially disposed annular shoulder and a generally tapered portion terminating at said annular shoulder;
   (c) the junction of said radially disposed annular shoulder and tapered portion having a convex form.
3. A drill bushing comprising:
   (a) a body provided with a drill passage therethrough;
   (b) the external surface of the body including a plurality of generally tapered portions;
   (c) the external surface of the body also including a plurality of radially disposed annular shoulders disposed intermediately of said generally tapered portions;
   (d) said radially disposed annular shoulders and generally tapered portions being provided with junctions of curved form.
4. A metallic drill bushing for use in a molded plastic mounting comprising:
   (a) a generally cylindrical body provided with an axial drill passage therethrough;
   (b) the external surface of said generally cylindrical body including a plurality of annular tapered portions;
   (c) the external surface of said generally cylindrical body also including a plurality of radially disposed annular shoulders disposed intermediately of said annular tapered portions;
   (d) said radially disposed annular shoulders and annular tapered portions being provided with junctions of curved form.
5. In a tooling plate, the combination comprising:
   (a) a plastic element;
   (b) a drill bushing embedded in the plastic element;
   (c) the drill bushing including a generally cylindrical body provided with a passage therethrough;
   (d) said drill passage including an upper mouth and a lower exit portion whereby a drill may be received in said mouth and project from said exit portion;
   (e) the external surface of said generally cylindrical body including a plurality of portions tapering downwardly and engaged with said plastic element;
   (f) the external surface of said generally cylindrical body also including a plurality of radially disposed annular shoulders disposed intermediately of said tapered portions and engaged with said plastic element;
   (g) the radially inward and outward elements of said radially disposed annular shoulders and tapered portions being provided with junctions of curved form;
   (h) the radially inward of said junctions being in radial spaced relation with respect to said plastic element, so as to define voids which act as insulators.

References Cited
UNITED STATES PATENTS

| | | | |
|---|---|---|---|
| 683,342 | 9/1901 | Sherman | 285—239 X |
| 1,166,059 | 12/1915 | Ledbetter | 285—239 |
| 2,519,035 | 8/1950 | Esty | 77—623 |
| 2,700,581 | 1/1955 | Migny | 308—238 |
| 3,022,685 | 2/1962 | Armacost | 77—62 |

FRANCIS S. HUSAR, *Primary Examiner.*